United States Patent [19]

Livermore

[11] Patent Number: 4,542,821

[45] Date of Patent: Sep. 24, 1985

[54] HUMP BACK CONVEYOR

[75] Inventor: Richard S. Livermore, Oregon City, Oreg.

[73] Assignee: Lamb-Weston, Inc., Portland, Oreg.

[21] Appl. No.: 468,564

[22] Filed: Feb. 22, 1983

[51] Int. Cl.$^4$ ............................................. B65G 17/10
[52] U.S. Cl. ..................................... 198/822; 198/851
[58] Field of Search ...................... 198/851, 853, 822; 110/329, 330; 432/137, 239; 266/178, 180, 185, 279

[56] References Cited

U.S. PATENT DOCUMENTS

| | | | |
|---|---|---|---|
| 1,224,445 | 5/1917 | Burpee | 198/853 |
| 1,302,221 | 4/1919 | Remmlein | 110/330 |
| 1,670,642 | 5/1922 | Van Brunt | 110/329 |
| 1,800,432 | 4/1931 | Buck | 198/853 |
| 1,807,502 | 5/1931 | Bennis | 110/329 |
| 2,288,006 | 6/1942 | Lloyd | 110/329 |
| 2,363,952 | 11/1944 | Beers | 198/853 |
| 3,034,638 | 5/1962 | Franz | 198/851 |
| 3,388,786 | 6/1968 | Thomson | 198/851 |

Primary Examiner—Joseph E. Valenza
Assistant Examiner—Kyle E. Shane
Attorney, Agent, or Firm—Klarquist, Sparkman, Campbell, Leigh & Whinston

[57] ABSTRACT

An endless conveyor particularly suited for use in food processing includes a plurality of conveyor flights flexibly connected at their sides by endless chains. Each flight has a longitudinally curved supporting portion upon which a supported product may be blanched, dried, or otherwise treated. The conveyor is supported at its ends by sprockets cooperable with the chains. The radius of curvature of the supporting portion approximates the pitch of the sprockets such that the conveyor flights, as they travel radially about the axis of rotation of the sprockets, form a continuous cylinder-like surface.

8 Claims, 7 Drawing Figures

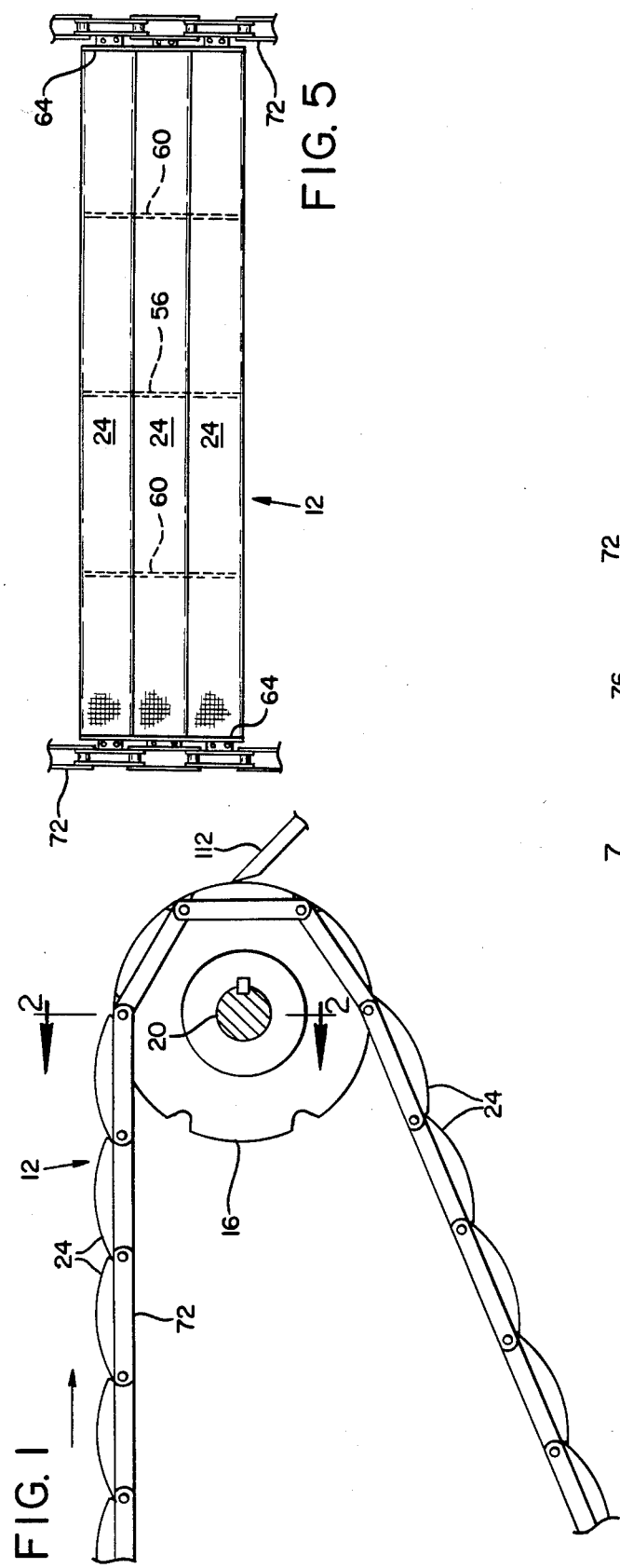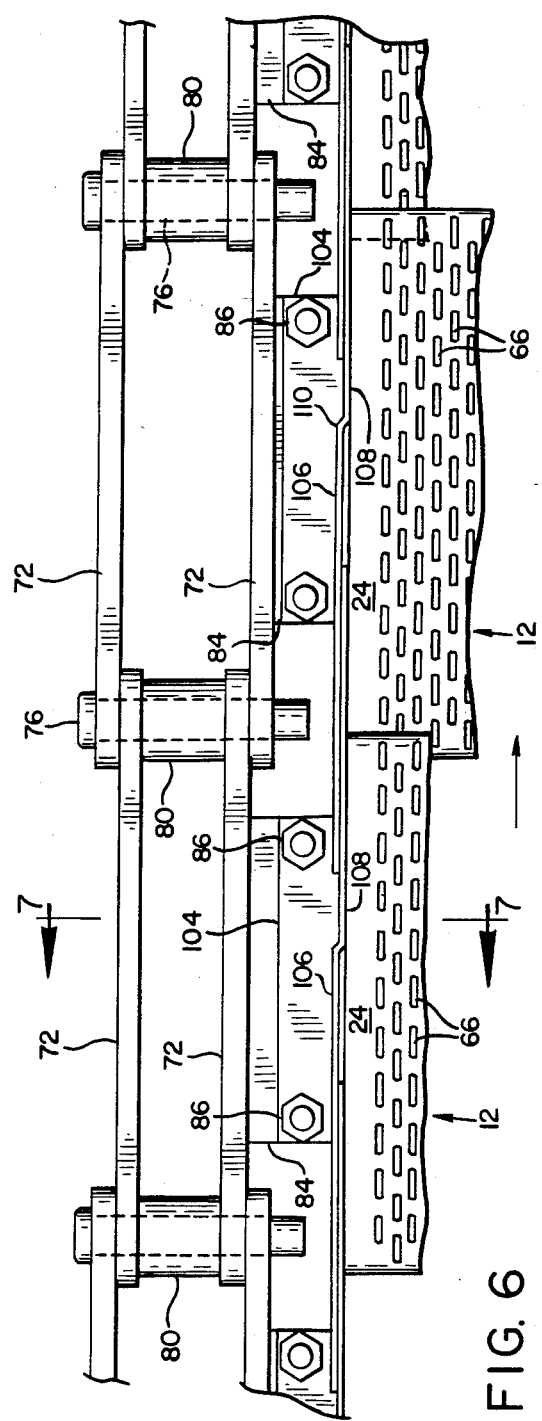

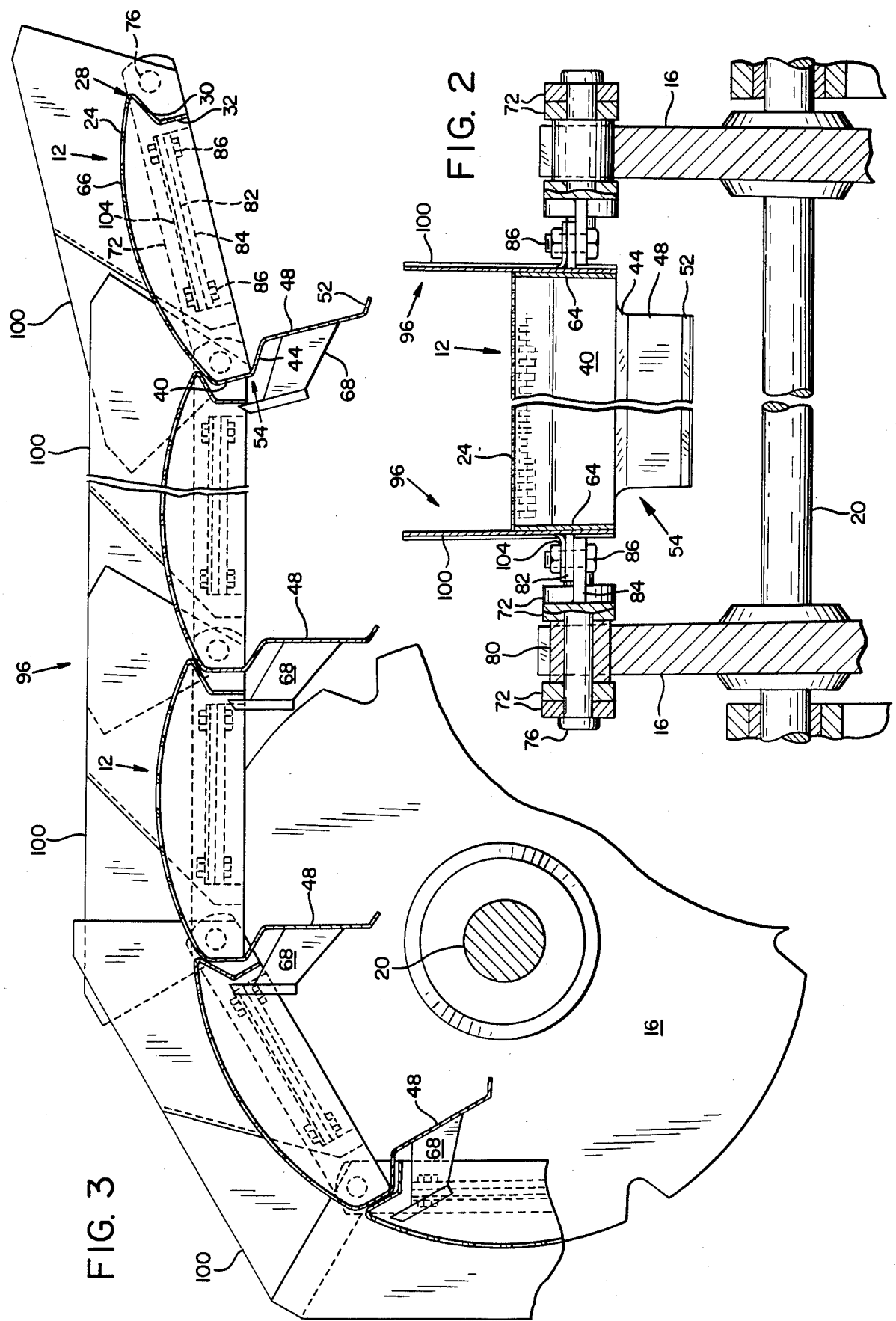

HUMP BACK CONVEYOR

The present invention relates generally to conveying apparatus, and more particularly to conveyors used in food processing, especially those used in drying or blanching food products.

BACKGROUND OF THE INVENTION

Conventional conveyors used in food processing typically include a plurality of wide, flat panel-like conveyor flights flexibly interconnected at opposite sides by a pair of chains to form an endless loop. These flights together define a long, wide, flat belt upon which the product is supported for drying, blanching, spraying and the like. Rows of apertures or slots may be provided in individual supporting surfaces of the flights to drain off excessive moisture or facilitate the flow of air therethrough. The conveyor is supported at its ends by sprockets which engage the chains and at its mid-section by side runners or rails.

In some food processing applications, such as the water blanching of potato strips, it is frequently desirable to submerge the product in hot water by running the belt down into, then up out of, a hot water pool.

The foregoing conveyor system has several significant disadvantages. First, the wide panel-like flights are structurally very weak and require considerable reinforcing to prevent transverse bending due to their own weight and the weight of the supported product. This problem is aggravated by the numerous slots or apertures in the supporting surfaces of the flights which further weaken the transverse strength of the flights. In fact, the edge portions of the flights cannot be perforated without seriously affecting the structural integrity of the flights. As a subsidiary problem, the reinforcing members required make cleaning of the apparatus difficult.

Second, the conveyed product is off-loaded non-uniformly because the product tends to stay on the surface of the underlying flight as it moves around a sprocket-supported end portion of the conveyor until the flight pivots to a critical point when the entire batch of product slides off the flight.

Third, it is difficult to scrape all the remaining product adhered to the flights therefrom (after off-loading) because a scraping device, or doctor blade, typically used for this function is pivoted at one end to provide clearance for the leading and trailing edges of the flights. Consequently, the blade is constantly pivoting back and forth to clear such edges and, therefore, does not maintain continuous contact with the flights. Adhered product which is not removed on the first pass must be removed either by expensive additional scraping equipment underlying the conveyor or by the primary scraping device during a subsequent pass after the product has been over-cooked or over-dried.

Finally, because the product will slide on steeply inclined surfaces, the product can be raised and lowered only by a relatively long, gently sloping conveyor path, making the conveyor relatively expensive.

Accordingly, there is a need for a simple, inexpensive conveyor that resists transverse bending stresses without requiring extensive reinforcing members, promotes uniform off-loading of the product, and is capable of conveying the product up and down relatively steep grades.

It is therefore one object of the invention to provide a conveying apparatus that resists transverse bending stresses without requiring extensive reinforcing members.

A second object of the invention is to provide a conveying apparatus as aforesaid having flights that can be perforated over their full width without substantially affecting the structural integrity thereof.

A further object of the invention is to provide a conveying apparatus as aforesaid that promotes uniform off-loading of the product.

Another object of the invention is to provide a conveying apparatus as aforesaid that facilitates continuous contact of the flights with scraping equipment used to remove adhered product therefrom, thereby virtually to eliminate overcooking or over-drying of the product caused by multiple passes of the product through blanching or drying equipment.

A still further object of the invention is to provide a conveying apparatus as aforesaid that does not require expensive, additional scraping equipment underlying the conveyor to scrape away unremoved product.

Yet another object of the invention is to provide a conveying apparatus as aforesaid that is capable of conveying product up and down relatively steep grades, thereby to shorten the conveyor length required to raise and lower the product a given height and to reduce the cost of the apparatus.

Another object of the invention is to provide conveying apparatus as aforesaid that is easy to clean.

Other objects and advantages of the invention will become apparent from the drawings and following detailed description.

SUMMARY OF THE INVENTION

In accordance with the foregoing objects, the present invention comprises a conveyor having a plurality of flights flexibly interconnected at opposite sides to form an endless loop. Each flight has a longitudinally curved supporting portion which may be provided with a plurality of openings to drain liquids or facilitate the flow of air therethrough. A sprocket means supports forward and rear ends of the loop. The supporting portion preferably has a radius of curvature approximating the pitch of the sprocket means. Each flight preferably has a nose portion that slightly overlaps an adjacent flight.

BRIEF DESCRIPTION OF THE DRAWINGS

In the drawings:

FIG. 1 is a side elevation view of a conveyor in accordance with the present invention showing portions thereof in somewhat schematic manner;

FIG. 2 is a vertical section of the conveyor taken along line 2—2 of FIG. 1;

FIG. 3 is an enlarged, longitudinal, vertical section of the conveyor showing a rear portion thereof;

FIG. 5 is a top plan view of a portion of the conveyor;

FIG. 6 is an enlarged, fragmentary top plan view of a side portion of the conveyor.

DETAILED DESCRIPTION OF A PREFERRED EMBODIMENT

An endless conveyor particularly suited for use in food processing includes a plurality of arched conveyor flights 12 flexibly interconnected by connecting means at their side edges to form an endless loop. The flights together define a long, wide, belt-like structure, upon which a product may be supported as it is dried, blanched or otherwise treated. The flights are preferably formed of a suitable sheet metal, such as stainless steel.

The conveyor is supported at each end by a sprocket means comprising a pair of sprockets 16 (FIGS. 1 and 2) cooperable with the connecting means to drive the conveyor. The sprockets at each end of the loop are keyed to a common shaft 20, at least one of which is driven by suitable means (not shown).

Figure 4:
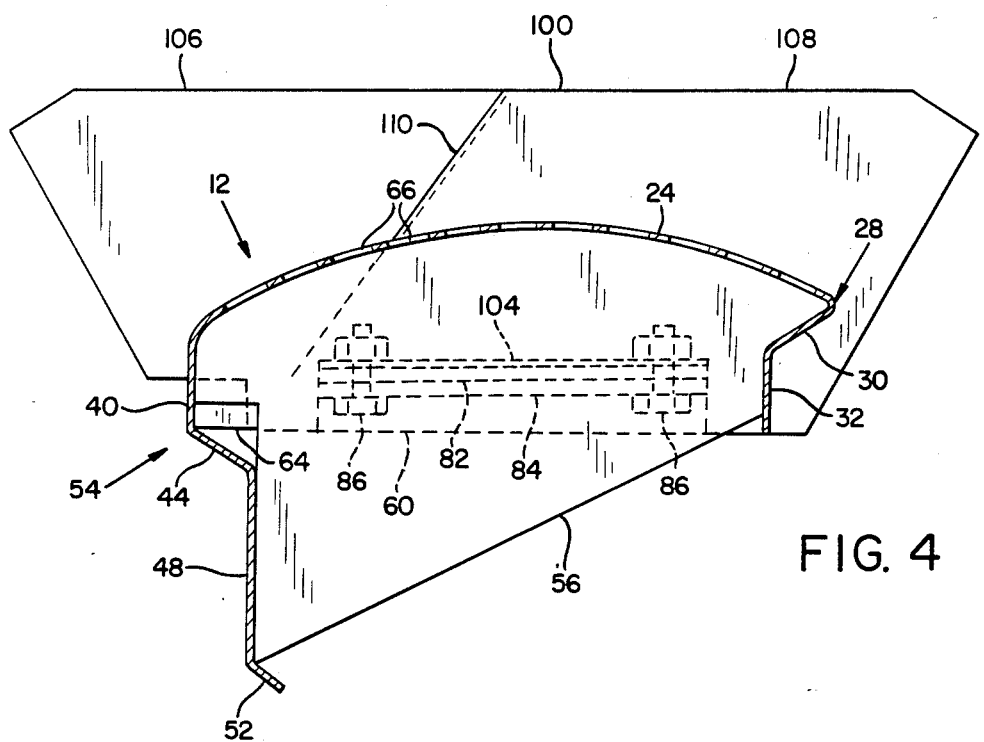
FIG. 4 is an enlarged, longitudinal, vertical section of a conveying flight of the conveyor.

Referring particularly to FIGS. 3 and 4, each conveyor flight 12 is formed to provide a longitudinally arched or convexly curved product-supporting portion 24 which includes a forwardly protruding nose portion 28. The "longitudinal" direction refers to the direction of travel of the conveyor. Each flight 12 is reversely curved at its forward end having a portion 30 extending angularly downwardly and defining the nose portion 28, as best shown in FIG. 4. Extending generally vertically downwardly from portion 30, and at an obtuse angle with respect to it, is a forward portion 32 spanning the full width of the flight. The radius of curvature of the portion 24 is substantially equal to the distance from such portion to the axis of the shaft 20 when a flight is positioned on a sprocket so that the flights moving around a sprocket present a substantially continuous, smooth curved surface concentric with such axis, as shown in FIGS. 1 and 3.

Figure 7:
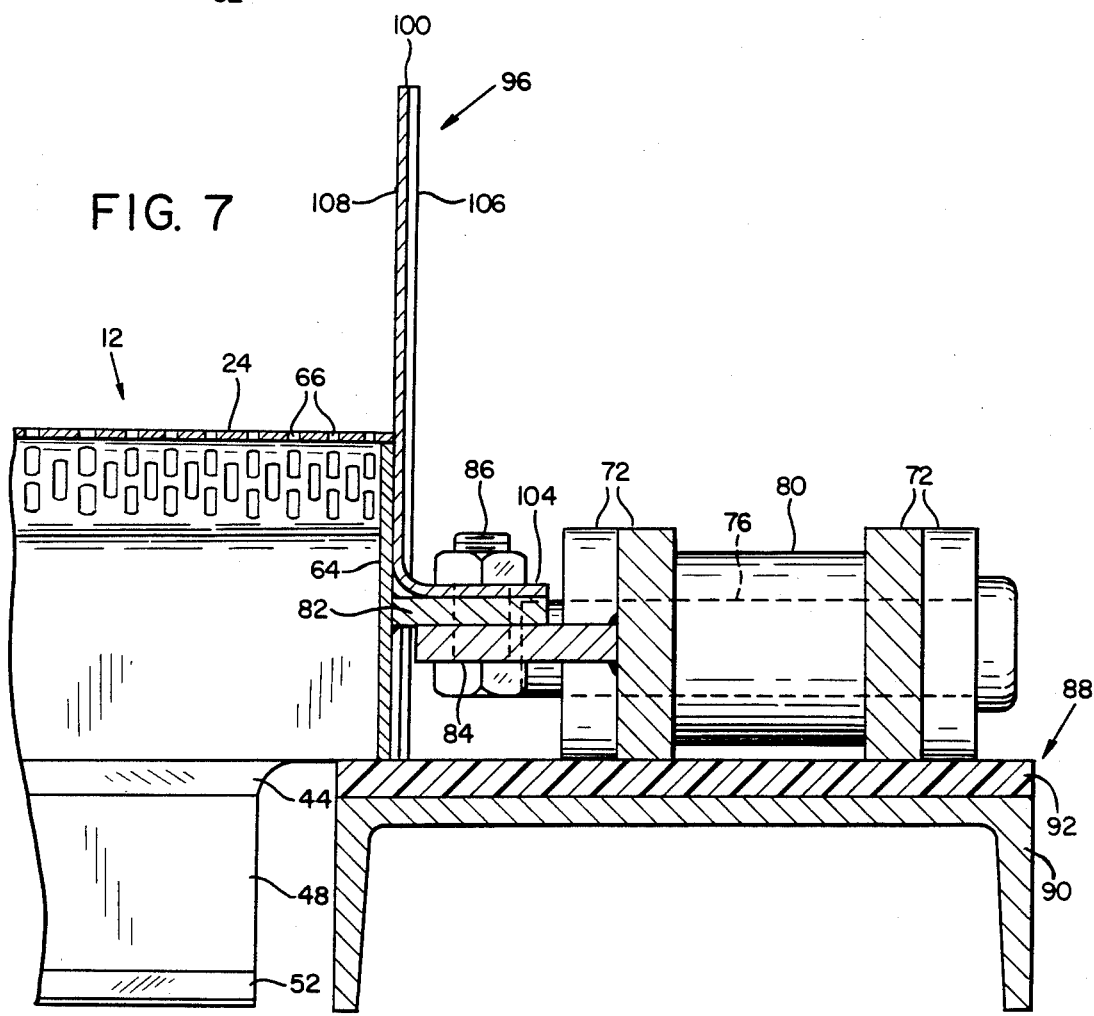
FIG. 7 is an enlarged vertical section taken along line 7—7 of FIG. 6.

At the trailing end of each flight, the sheet is bent first vertically downwardly to form a short vertical first portion 40 and thence inwardly and angularly downwardly to provide a short second portion 44. Finally, a tail 48 extends vertically downwardly from second portion 44, terminating at an inwardly and downwardly angled lip 52. First and second portions 40,44 together form a tail section 54 and define an obtuse angle approximating the aforementioned obtuse angle therebetween. As indicated in FIG. 7, second portion 44 does not extend quite the full width of the flight so as to provide adequate side clearance.

As shown in FIG. 3. the nose of each flight slightly overlaps the trailing edge of the next forward flight when the flights move along a generally straight path. Moreover, when adjoining flights move around the axis of rotation of sprockets 16, i.e, shaft 20, the complementary shapes of the forward portion of one flight and the tail section of the next forward flight cause the flights to be in nested relationship, thereby to define a continuous curved surface.

Tail 48 and lip 52, together with portion 32 and tail section 54, stiffen considerably the conveyor flight to resist transverse bending stresses caused by the substantial weight of the flight itself and the product supported thereon. The longitudinal stiffness of the flight is buttressed by center gusset 56, intermediate gussets 60 and end gussets 64, see FIGS. 4 and 5.

Rows of slots or apertures 66 may be provided in supporting portion 24 to permit the movement of fluid therethrough, as when potato strips are blanched with a high volume, downwardly-directed water spray. The slots may also serve to facilitate the flow of air through the conveyor, as when potato strips are dried by blowing air through strips supported on the conveyor.

A stop 68 (FIG. 3) is preferably secured, such as by welding, to tail 48 of the flight and cooperates with portion 32 of the following flight to prevent the former flight from rocking or pivoting too far relative to such following flight.

Referring particularly to FIGS. 6 and 7, the illustrated connecting means comprises an endless conveyor chain having opposed link elements 72, connecting pins 76 and spacing collars 80. Each conveyor flight 12 has at each side a transversely extending flange 82 welded to end gusset 64 for fastening to the ajacent link element 72, to which is welded a flange 84. Flanges 82 and 84 are fastened by bolts 86.

Both conveyor chains, as well as the sides of the conveyor flights, are supported by side rails 88 (FIG. 7), comprising a channel member 90 having a low friction coating or strip 92, such as a UHMW strip adhered thereto.

Referring to FIGS. 3, 4 and 7, a pair of fan-shaped skirt sections 100 is associated with each conveyor flight, one on each side. Each skirt section has an outwardly bent flange 104 for rigid fastening by bolts 86 to flange 82. In this way, each skirt section moves and pivots with its associated conveyor flight. Each skirt section is formed with offset portions 106,108 (FIGS. 4 and 7) separated by a diagonal jog-like bend 110 near its mid-section, so that the portion 106 of one skirt section overlaps the portion 108 of the skirt section of the following flight, as best shown in FIG. 7. The overlapping skirt sections thus form a continuous unbroken skirt 96 (FIG. 3) on each side of the conveyor. The skirt 96 serves to prevent the conveyed product from falling off or, when submersed in hot water, floating over the sides of the conveyor flights. Because of the overlapping of the skirt sections, a continuous and unbroken skirt is maintained even when the flights undergo negative and positive bends, such as when the flights move radially about shafts 20.

It will be apparent from the foregoing that the conveyor flights are relatively light and yet have a rigid construction able to withstand substantial transverse and longitudinal bending stresses without requiring extensive reinforcing members. The sections can therefore be perforated over their full width. Moreover, with only a few reinforcing gussets, the conveyor is relatively easy to clean.

Additionally, the conveyor flights form a smooth radially curved surface as they travel about the end portions of the conveyor, allowing the product to slide off the sections uniformly at the discharge end without "batching".

Equally important, the smooth, radially curved surface at the discharge end of the conveyor enables a scraping device, such as a doctor blade 112 (FIG. 1), to maintain virtually continuous contact with the conveyor, thereby to remove essentially all the product adhered to the conveyor. This is due to the nested relationship between adjacent flights and a predetermined radius of curvature for the supporting portions of the flights that approximates the pitch of the supporting sprockets. The need for expensive, additional scraping equipment or, alternatively, the presence of overcooked or over-dried product caused by multiple passes of the product through the blancher or dryer is therefore eliminated.

The present invention also is able to convey the product up and down relatively steep grades, limited only by the restrained movement of stop 68, because the curved supporting portions of the flights form pockets therebetween to retain the product. The conveyor can therefore be shorter, and hence less expensive when, for example, the conveyed product must be lowered a given distance into a water dip and raised therefrom.

Having illustrated and described the principles involved in this invention, by what is presently a preferred embodiment and several suggested alternatives, it should be apparent to those persons skilled in the art that such embodiments may be modified in arrangement and detail without departing from such principles.

I claim as my invention all such modifications as come within the true spirit and scope of the invention as defined by the following claims:

1. An endless loop conveyor comprising:
    a plurality of elongate conveyor flights;
    connecting means flexibly interconnecting each flight along opposite longitudinal edges to adjacent flights to form an endless loop;
    sprocket means for supporting forward and rearward ends of the loop;
    support means extending between the sprocket means for supporting the opposite ends of each flight;
    each conveyor flight being formed of a single piece of sheet metal and having
    (a) a longitudinally curved product-supporting portion,
    (b) a forwardly protruding nose portion spanning the full width of the flight, the nose portion vertically overlapping a forward adjacent flight when such flights follow a substantially straight path,
    (c) said nose portion being defined by a forward edge of said product-supporting portion and a further portion of the flight extending generally rearwardly at an acute angle to the product-supporting portion, and
    (d) a forward portion extending from said further flight portion generally perpendicular to the direction of travel of the flight and spanning the full width of the flight, the forward portion forming an obtuse angle with said further flight portion;
    whereby each flight is capable of supporting its own weight and the weight of the product supported thereon without requiring transverse supporting members.

2. An apparatus according to claim 1 wherein the supporting portion of each flight has a radius of curvature approximating the distance from the supporting portion to an axis of rotation of the sprocket means such that when adjacent flights move radially about the sprocket means their curved surfaces form a smooth, radially curved surface concentric with the axis of rotation of the sprocket means.

3. An apparatus according to claim 1 including skirt means secured to opposite sides of the flights and movable therewith to prevent items conveyed by the flights from falling transversely off the flights.

4. An apparatus according to claim 3 wherein the skirt means comprises a plurality of overlapping skirt section mounted adjacent side edges of the conveyor flights for relative sliding movement between adjacent skirt sections to form an unbroken skirt for the flights even when adjacent flights together undergo positive or negative bends.

5. An endless loop conveyor comprising:
    a plurality of conveyor flights;
    connecting means flexibly interconnecting each flight to adjacent flights to form an endless loop; and
    sprocket means for supporting forward and rear ends of the loop;
    each conveyor flight having a longitudinally curved product-supporting portion and a forwardly protruding nose portion spanning the full width of the flight, the nose portion vertically overlapping a forward adjacent flight when such flights generally follow a straight path;
    each flight being formed of metal sheet and including a forward portion generally perpendicular to the direction of travel of the flight and spanning the full width of the flight, the forward portion adjoining a portion of the nose and forming an obtuse angle therewith;
    each flight including a tail section having a flat first portion generally perpendicular to the direction of travel of the flight and spanning the full width thereof and a second portion extending forwardly from the first portion at an obtuse angle therefrom, such angle corresponding to the angle between the forward portion and nose portion such that the tail section is in nested relationship with the nose portion and forward portion of the adjacent flight when such flights move radially about the sprocket means.

6. An apparatus according to claim 5 wherein each flight includes a tail extending from the second portion generally perpendicularly to the direction of travel of the flight, the tail spanning substantially the full width of the flight and terminating at a lip extending angularly therefrom.

7. An apparatus according to claim 1 including means defining spaced openings across the entire width and length of the product-supporting portion of each flight.

8. In an endless conveyor used in food processing, a conveyor flight of sheet metal forming one of a plurality of endlessly and flexibly connected flights supported along opposite longitudinal edges, the sheet metal flight comprising:
    an arcuate supporting portion;
    means defining a plurality of spaced openings in the supporting portion across its entire length and width;
    a forwardly protruding nose defined by a forward edge of said supporting portion and a further portion of the flight extending generally rearwardly at an acute angle to the supporting portion, and
    a forward portion generally perpendicular to the direction of travel of the flight and spanning the full width of the flight, the forward portion adjoining a portion of the nose at an obtuse angle thereto; and
    a rearwardly protruding tail section having a flat first portion generally perpendicular to the direction of travel of the flight and spanning the full width thereof and a second portion extending forwardly from the first portion at an obtuse angle thereto, such angle approximately the angle between the forward portion and nose portion;
    whereby the arcuate supporting portion, forward portion and tail section cooperate to provide increased transverse rigidity without requiring an underlying transverse supporting member.

* * * * *